(12) United States Patent
Sato et al.

(10) Patent No.: US 10,619,063 B2
(45) Date of Patent: Apr. 14, 2020

(54) WATER-BASED PIGMENT TYPE INKJET INK COMPOSITION

(71) Applicant: SAKATA INX CORPORATION, Osaka-shi, Osaka (JP)

(72) Inventors: Yoichi Sato, Osaka (JP); Taichi Ono, Osaka (JP); Hiroyuki Konishi, Osaka (JP); Kazuki Moriyasu, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 5 days.

(21) Appl. No.: 16/079,971

(22) PCT Filed: Feb. 15, 2017

(86) PCT No.: PCT/JP2017/005400
§ 371 (c)(1),
(2) Date: Aug. 24, 2018

(87) PCT Pub. No.: WO2017/145882
PCT Pub. Date: Aug. 31, 2017

(65) Prior Publication Data
US 2019/0161633 A1  May 30, 2019

(30) Foreign Application Priority Data

Feb. 26, 2016  (JP) ................. 2016-035948

(51) Int. Cl.
| | | |
|---|---|---|
| *C09D 11/322* | (2014.01) | |
| *B41M 5/00* | (2006.01) | |
| *C09D 11/033* | (2014.01) | |
| *C09D 11/037* | (2014.01) | |
| *C09D 11/107* | (2014.01) | |
| *C09D 11/326* | (2014.01) | |

(52) U.S. Cl.
CPC ............. *C09D 11/322* (2013.01); *B41M 5/00* (2013.01); *C09D 11/033* (2013.01); *C09D 11/037* (2013.01); *C09D 11/107* (2013.01); *C09D 11/326* (2013.01)

(58) Field of Classification Search
CPC ...... B41M 5/00; C09D 11/326; C09D 11/033; C09D 11/107; C09D 11/322; C09D 11/037
USPC .................................................. 523/160, 161
See application file for complete search history.

(56) References Cited

U.S. PATENT DOCUMENTS

| | | | |
|---|---|---|---|
| 2002/0077384 A1* | 6/2002 | Sano ...................... | C09D 11/32 523/160 |
| 2009/0169748 A1 | 7/2009 | House et al. | |

FOREIGN PATENT DOCUMENTS

| | | | |
|---|---|---|---|
| JP | 2001-234109 | * | 8/2001 |
| JP | 2001234109 A | | 8/2001 |
| JP | 2002294133 A | | 10/2002 |
| JP | 2004027156 A | | 1/2004 |
| JP | 2008150535 A | | 7/2008 |
| JP | 2009219968 A | | 10/2009 |
| JP | 2010222470 A | | 10/2010 |
| JP | 2011088977 A | | 5/2011 |
| JP | 2018012219 A | | 1/2018 |
| JP | 2018104582 A | | 7/2018 |
| WO | 2018016141 A1 | | 1/2018 |
| WO | 2018123739 A1 | | 7/2018 |

OTHER PUBLICATIONS

Machine translation of JP 2001-234109 (Year: 2001).*
Notification Concerning Transmittal of International Preliminary Report on Patentability (PCT/IB326) and Notification of Transmittal of Translation of the International Preliminary Report on Patentability (PCT/IB/338) dated Sep. 7, 2018, with International Preliminary Report on Patentability (PCT/IB/373) and Written Opinion of the International Searching Authority (PCT/ISA/237), for corresponding international application PCT/JP2017/005400.
International Search Report (ISR) dated Apr. 4, 2017, issued for International application No. PCT/JP2017/005400.
Extended European Search Report (EESR) dated Sep. 27, 2019, issued for European counterpart patent application No. EP17756322.8 (6 pages).

* cited by examiner

*Primary Examiner* — Doris L Lee
(74) *Attorney, Agent, or Firm* — Law Office of Katsuhiro Arai

(57) ABSTRACT

A water-based pigment type inkjet ink composition contains: a pigment whose surface is formed as a resin layer produced by crosslinking, using a crosslinking agent having two or more functionalities, an alkali-soluble resin whose acid value is 40 to 300 KOHmg/g, and 50 to 90% of whose acid groups have been neutralized by a basic compound; a water-soluble organic solvent; and a surface-active agent; wherein the alkali-soluble resin is such that lauryl(meth)acrylate is contained in the alkali-soluble resin, as its constitutional unit monomer, by 20 to 40 percent by mass relative to the total quantity of monomers. The water-based pigment type inkjet ink composition can exhibit good printability characteristics as well as a wide color gamut and can also offer excellent storage stability.

8 Claims, No Drawings

WATER-BASED PIGMENT TYPE INKJET INK COMPOSITION

This application is the U.S. National Phase under 35 U.S.C. § 371 of International Application PCT/JP2017/005400, filed Feb. 15, 2017, which claims priority to Japanese Patent Application No. 2016-035948, filed Feb. 26, 2016. The International Application was published under PCT Article 21(2) in a language other than English.

TECHNICAL FIELD

The present invention relates to a water-based pigment type inkjet ink composition offering excellent storage stability, which also exhibits good printability characteristics such as absence of bleeding, etc., as well as a wide color gamut, even when printed on absorbent media such as plain paper or low-absorbent media such as coated offset printing paper.

BACKGROUND ART

The inkjet printing method is a printing/recording method whereby ink droplets are directly discharged from a very fine nozzle and deposited onto a base material for printing/recording, to obtain text and images.

The water-based inkjet printing method has traditionally been believed not suitable for the manufacturing of large volumes of printed matters due to such problems as long printing times required by scanning-type print heads, slow drying of water-based media, and so on.

On the other hand, the inkjet printing method has such advantages as not requiring a platemaking process unlike standard printing methods, and enabling printing using equipment of much simpler constitution compared to other methods including the electrophotographic method, and therefore the inkjet printing method has mostly been used in personal and home applications.

In light of the above, the inkjet printing method is worthy enough as a competitor of other printing methods for use in office, commercial printing, and other industrial applications, so long as the aforementioned problems of long printing and drying times can be resolved. For this reason, art of increasing the printing speed and applying low-cost printing paper is actively studied in recent years, from the viewpoints of both printing equipment and ink, with the aim of using the inkjet printing method in industrial applications.

In industrial applications, not only uncoated paper such as inexpensive plain paper and standard offset printing paper, but also low-absorbent media such as coated paper, are being studied for use as base materials for printing. In the case of uncoated paper, ink droplets containing pigment permeate into the uncoated paper the moment they reach the paper, thereby causing the resulting printed matter to lack a feeling of denseness and have a narrow color gamut. In the case of a low-absorbent medium, on the other hand, ink droplets are not easily absorbed into the medium and thus create bleeding on the printed matter. In addition, storage stability, which is an essential performance requirement imposed by the inkjet printing method on inks, must also be offered.

To solve these problems, a method for manufacturing water-based pigment dispersant wherein a pigment, a (meth) acrylic acid ester copolymer, and an organic compound containing glycidyl groups, are dispersed and cross-linked in a water-based medium, is disclosed (refer to Patent Literature 1, for example).

However, the water-based pigment inks containing the aforementioned pigment dispersant could not achieve satisfactory levels of storage stability and color gamut.

Additionally, to solve the aforementioned problems, a water-based inkjet recording ink composition containing inkjet recording crosslinked polymer grains is disclosed, wherein the crosslinked polymer grains contain a colorant, the crosslinked polymer grains are obtained by crosslinking a polymer using a crosslinking agent that contains two or more epoxy groups, and the polymer contains a constitutional unit derived from a direct-chain or branched-chain alkyl group or alkenyl group-containing monomer with 6 to 22 carbon atoms (refer to Patent Literature 2, for example).

According to the Examples in Patent Literature 2, however, the water-based inkjet recording ink composition containing crosslinked polymer grains that in turn contain a constitutional unit derived from stearyl methacrylate by 10% in the polymer, is described as having poorer stability than the water-based inkjet recording ink composition containing crosslinked polymer grains that in turn contain a constitutional unit derived from lauryl methacrylate by 10% in the polymer. Also, the stability of the water-based inkjet recording ink composition containing crosslinked polymer grains that in turn contain a constitutional unit derived from lauryl methacrylate by 10% in the polymer was not yet at a satisfactory level.

BACKGROUND ART LITERATURE

Patent Literature

Patent Literature 1: Japanese Patent Laid-open No. 2004-027156
Patent Literature 2: Japanese Patent Laid-open No. 2008-150535

SUMMARY OF THE INVENTION

Problems to Be Solved by the Invention

An object of the present invention is to provide a water-based inkjet ink composition offering excellent storage stability, which also exhibits good printability characteristics as well as a wide color gamut even when printed on low-absorbent media (coated paper, etc.) or absorbent media (uncoated paper).

Means for Solving the Problems

The inventors of the present invention studied in earnest to achieve the aforementioned object and, as a result, invented a water-based inkjet ink composition that encompasses the following:

1. A water-based pigment type inkjet ink composition, containing: a pigment whose surface is formed as a resin layer produced by crosslinking, using a crosslinking agent having two or more functionalities, an alkali-soluble resin whose acid value is 40 to 300 KOHmg/g, and 50 to 90% of whose acid groups have been neutralized by a basic compound; a water-soluble organic solvent; and a surface-active agent; wherein the alkali-soluble resin is such that lauryl (meth)acrylate is contained in the alkali-soluble resin, as its constitutional unit monomer, by 20 to 40 percent by mass relative to the total quantity of monomers.
2. A water-based pigment type inkjet ink composition according to 1, characterized in that the crosslinking agent is a bifunctional epoxy crosslinking agent.

3. A water-based pigment type inkjet ink composition according to 1 or 2, wherein the content of the water-soluble organic solvent in the water-based pigment type inkjet ink composition is 10 to 40 percent by mass.

4. A method for manufacturing water-based pigment type inkjet ink composition, comprising: forming a coating layer on the surface of a pigment using an alkali-soluble resin which contains lauryl (meth)acrylate by 20 to 40 percent by mass, whose acid value is 40 to 300 KOHmg/g, and 50 to 90% of whose acid groups have been neutralized by a basic compound; crosslinking this coating layer using a crosslinking agent having two or more functionalities, to obtain a coated pigment; and then mixing this coated pigment with a water-soluble organic solvent and a surface-active agent.

5. A method for manufacturing water-based pigment type inkjet ink composition according to 4, characterized in that the crosslinking agent is a bifunctional epoxy crosslinking agent.

6. A method for manufacturing water-based pigment type inkjet ink composition according to 4 or 5, wherein the content of the water-soluble organic solvent in the water-based pigment type inkjet ink composition is 10 to 40 percent by mass.

Effects of the Invention

According to the water-based pigment type inkjet ink composition proposed by the present invention, prominent effects can be demonstrated that include excellent storage stability of the ink composition itself, and also good printability characteristics such as absence of bleeding, etc., as well as a wide color gamut, even when printed on absorbent media (plain paper) or low-absorbent media (coated paper, etc.).

MODE FOR CARRYING OUT THE INVENTION

The inventors of the present invention found that the aforementioned object could be achieved using a water-based pigment type inkjet ink composition that contains a coated pigment which is produced by crosslinking, using a crosslinking agent having two or more functionalities, a pigment that has been coated with a specific alkali-soluble resin, and they consequently developed the present invention as a solution.

The water-based pigment type inkjet ink composition proposed by the present invention is explained below.

<Pigment>

Pigments used for the alkali-soluble resin-coated pigment include various inorganic pigments and organic pigments generally used in inkjet inks.

To be specific, the inorganic pigments include titanium oxide, red iron oxide, antimony red, cadmium yellow, cobalt blue, ultramarine blue, Prussian blue, carbon black, graphite, and other colored pigments (including coloring pigments of achromatic colors such as white and black), as well as calcium carbonate, kaolin, clay, barium sulfide, aluminum hydroxide, talc, and other extender pigments.

The organic pigments include soluble azo pigments, insoluble azo pigments, azo-lake pigments, condensed azo pigments, copper phthalocyanine pigments, condensed polycyclic pigments, etc.

Any of these pigments may be used alone, or two or more types may be combined.

Also, to be specific, preferably the aforementioned pigment is C. I. Pigment Red 5, 7, 12, 57:1, 122, 146, 202, 242, 282, or other red pigment; C. I. Pigment Blue 1, 2, 15:3, 15:4, 16, 17, 60, or other blue pigment; C. I. Pigment Violet 19, 23 or other violet pigment; C. I. Pigment Yellow 12, 13, 14, 17, 74, 83, 93, 128, 139, 151, 154, 155, 180, 185, 213, or other yellow pigment; C. I. Pigment Black 7 (carbon black) or other black pigment; C. I. Pigment Green 7, 36, or other green pigment, C. I. Pigment Orange 34, 71, etc., or other orange pigment, etc., especially from the viewpoint of enabling an expression of vivid hue.

<Alkali-soluble Resin>

For the alkali-soluble resin with which to coat the aforementioned pigment, any alkali-soluble resin meeting (a) to (c) below may be used:

(a) the acid value of the alkali-soluble resin is 40 to 300 KOHmg/g;

(b) 50 to 90% of the acid groups in the alkali-soluble resin have been neutralized by a basic compound; and (c) the alkali-soluble resin is such that lauryl (meth)acrylate is contained by 20 to 40 percent by mass as its constitutional unit monomer, along with a monomer having aromatic rings, preferably a styrene monomer, in the alkali-soluble resin.

For such alkali-soluble resin, a copolymer containing a monomer having carboxyl groups that serves as a constitutional unit, as well as lauryl (meth)acrylate and a monomer having aromatic rings for improving the absorptivity to the resin, or a copolymer obtained by reacting together these monomers and other polymerizable monomer as necessary, may be used, for example.

The aforementioned monomer having carboxyl groups, which is used to make the resin soluble in alkalis, may be, for example, acrylic acid, methacrylic acid, crotonic acid, itaconic acid, maleic acid, fumaric acid, 2-carboxy ethyl (meth)acrylate, 2-carboxy propyl (meth)acrylate, maleic anhydride, maleic acid monoalkyl ester, citraconic acid, citraconic anhydride, citraconic acid monoalkyl ester, etc.

Also, the aforementioned monomer containing hydrophobic groups, which is used to improve the absorptivity to the pigment, may be, for example, styrene, α-styrene, vinyl toluene, or other styrene monomer, benzyl (meth)acrylate, etc., as lauryl (meth)acrylate and a monomer having aromatic rings. Here, a styrene monomer represents a compound whose basic skeleton is styrene and which may have any substitutional group. Preferably the alkali-soluble resin is a monomer having aromatic rings, preferably containing a styrene monomer, by 30 to 60 percent by mass.

In terms of dispersion stability and solidification property, preferably the alkali-soluble resin contains lauryl (meth)acrylate by 20 to 40 percent by mass. It should be noted that lauryl (meth)acrylate can be used together with stearyl (meth)acrylate to the extent that doing so does not impair the effects achieved by using lauryl (meth)acrylate, although use of stearyl (meth)acrylate is not necessary.

Also, other polymerizable monomers that may be used as necessary to the extent that they do not lead to a drop in performance include methyl (meth)acrylate, ethyl (meth)acrylate, propyl (meth)acrylate, isopropyl (meth)acrylate, butyl (meth)acrylate, hexyl meth(acrylate) and other (meth)acrylates, hydroxy ethyl (meth)acrylate, acrylamide, N-methylol acrylamide, 2-ethyl hexyl (meth)acrylate, octyl (meth)acrylate, stearyl (meth)acrylate, 2-hydroxy stearyl (meth)acrylate, dodecyl vinyl ether, vinyl 2-ethyl hexanoate, vinyl laurate, vinyl stearate, cyclohexyl (meth)acrylate, benzyl (meth)acrylate, etc.

The acid value of the alkali-soluble resin is preferably 40 to 300 KOHmg/g, or more preferably 70 to 250 KOHmg/g. If the acid value of the alkali-soluble resin is lower than 40 KOHmg/g, the dispersion stability of the resulting water-based liquid in which the pigment coated with the alkali-soluble resin has been dispersed, may become lower; if the acid value is higher than 300 KOHmg/g, on the other hand, the hydrophilicity becomes too high and the storage stability and water resistance may drop as a result.

Preferably 50 to 90% of the acid groups in the alkali-soluble resin have been neutralized by a basic compound. If the degree of neutralization is less than 50%, the dispersion stability may drop; if it is over 90%, on the other hand, the storage stability and water resistance may drop.

The molecular weight of the alkali-soluble resin is preferably 3,000 to 100,000, or more preferably 10,000 to 50,000, based on mass-averaged molecular weight. If the mass-averaged molecular weight of the alkali-soluble resin is less than 3,000, the pigment dispersion stability and the abrasion resistance of the obtained printed matter tend to drop; if it exceeds 100,000, on the other hand, the viscosity increases, which is not desirable.

Acid Value

The acid value (AV) is a theoretical value of acidity, indicating how many milligrams of potassium hydroxide are theoretically needed to neutralize 1 gram of an alkali-soluble resin, calculated arithmetically based on the composition of monomers used to synthesize the alkali-soluble resin.

Weight-averaged Molecular Weight

The weight-averaged molecular weight can be measured according to the gel permeation chromatography (GPC) method. As an example, a polystyrene-equivalent weight-averaged molecular weight can be obtained by conducting chromatography using Waters 2690 (manufactured by Waters) as a GPC system and PLgel 5 μm, MIXED-D (manufactured by Polymer Laboratories) as a column.

(Basic Compound)

The basic compound that neutralizes the acid groups in the alkali-soluble resin may be sodium hydroxide, potassium hydroxide, or other inorganic basic compound, ammonium, methylamine, ethylamine, monoethanol amine, N,N-dimethyl ethanol amine, N,N-diethyl ethanol amine, N,N-dibutyl ethanol amine, diethanol amine, N-methyl diethanol amine, triethanol amine, morpholine, N-methyl morpholine, N-ethyl morpholine, or other organic basic compound, etc. Any of these basic compounds may be used alone, or two or more types may be mixed. Among these, monoethanol amine, N,N-dimethyl ethanol amine, N,N-diethyl ethanol amine, N,N-dibutyl ethanol amine, diethanol amine, N-methyl diethanol amine, triethanol amine, or other alkanol amine is preferred, from the viewpoint of pigment dispersion.

(Crosslinking Agent Having Two or More Functionalities)

The purpose of using the crosslinking agent having two or more functionalities, in the manufacturing of the coated pigment, is to crosslink the alkali-soluble resin to an appropriate degree. The crosslinking agent used in the present invention is a crosslinking agent having two or more reactive functional groups, and preferably the molecular weight of the crosslinking agent is in a range of 100 to 2000 from the viewpoints of ease of reaction and storage stability.

Preferably the reactive functional groups include at least one selected from the group that includes epoxy groups, hydroxyl groups and aziridine groups. Among these, epoxy groups are preferred in terms of viscosity and tolerance, and an epoxy compound having two or more functionalities is more preferred.

Specific examples of epoxy compounds having two or more functionalities include Epolite 40E, 100E, 200E, 400E, 70P, 200P, 400P, 1500NP, 1600, 80MF (manufactured by Kyoeisha Chemical), Denacol EX-201, EX-211, EX-212, EX-313, EX-314, EX-321, EX-411, EX-421, EX-512, EX-521, EX-611, EX-612, EX-614, EX-614B, EX-622 (manufactured by Nagase ChemteX), etc.

(Manufacturing of Coated Pigment)

As for the coated pigment under the present invention, an alkali-soluble resin whose acid groups have been neutralized by a basic compound, and a pigment, are dissolved or dispersed in a water-based solvent, after which the alkali-soluble resin is salted out or otherwise made insoluble and also deposited onto the pigment surface. Fifty to 90% of the acid groups in this deposited, insoluble resin are neutralized. Using the obtained pigment that has been coated with the alkali-soluble resin, a liquid dispersion in which the pigment is dispersed is obtained, after which a crosslinking agent is added to this liquid dispersion, and then this mixture is heated to crosslink, and thereby make insoluble, the alkali-soluble resin coating the pigment surface, to manufacture the coated pigment.

Here, the obtained crosslinked alkali-soluble resin has a crosslinking ratio of 10 to 90%, or preferably 20 to 80%, or more preferably 30 to 70%, or even more preferably 35 to 50%, relative to the theoretical acid value of the alkali-soluble resin. If the crosslinking ratio is less than 10%, the pigment may not be coated with sufficient strength; if it exceeds 90%, on the other hand, the dispersion stability of the pigment may be inhibited.

<Water-soluble Organic Solvent>

In the water-based pigment type inkjet ink composition proposed by the present invention, the water-soluble organic solvent is used as a water-based medium together with water.

Preferably the water is ion exchanged water or distilled water from which metal ions, etc., have been removed.

Also, mixing the water-soluble organic solvent may add even better inkjet printability characteristics in terms of storage stability, discharge stability, jetting property of ink, etc. Water-soluble organic solvents that can add such characteristics include, for example, monoalcohols, polyalcohols, polyalcohol lower alkyl ethers, ketones, ethers, esters, nitrogen-containing compounds, etc. Any of these may be used alone, or two or more types may be combined.

Specific examples of the monoalcohols include methanol, ethanol, n-propanol, n-butanol, n-pentanol, n-hexanol, n-heptanol, n-octanol, n-nonyl alcohol, n-decanol and isomers thereof, cyclopentanol, cyclohexanol, etc., among which alcohols having alkyl groups with 1 to 6 carbon atoms are preferred.

Specific examples of the polyalcohols include ethylene glycol, propylene glycol, 1,3-butylene glycol, 1,4-butylene glycol, 1,2-pentane diol, 1,5-pentane diol, neopentyl glycol, 1,2-hexane diol, 1,6-hexane diol, 1,2-cyclohexane diol, heptane diol, 1,8-octane diol, 1,9-nonane diol, 1,10-decane diol, glycerin, pentaerythritol, diethylene glycol, dipropylene glycol, triethylene glycol, tetraethylene glycol, polyethylene glycol, polypropylene glycol, thiodiglycol, etc.

Specific examples of the polyalcohol lower alkyl ethers include ethylene glycol monomethyl ether, ethylene glycol dimethyl ether, ethylene glycol monoethyl ether, ethylene glycol diethyl ether, ethylene glycol monopropyl ether, ethylene glycol isopropyl ether, ethylene glycol monbutyl ether, ethylene glycol isobutyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, dipropylene glycol mono-n-propyl ether, dipropylene glycol mono-n-butyl ether, etc.

Specific examples of the ketones include acetone, methyl ethyl ketone, methyl butyl ketone, methyl isobutyl ketone, diisopropyl ketone, cyclopentanone, cyclohexanone, etc.

Specific examples of the ethers include isopropyl ether, n-butyl ether, tetrahydrofuran, tetrahydropyran, 1,4-dioxane, etc.

Examples of the esters include propylene carbonate, methyl acetate, ethyl acetate, propyl acetate, isopropyl acetate, butyl acetate, isobutyl acetate, amyl acetate, ethyl lactate, ethyl butyrate, dibutyl phthalate, dioctyl phthalate, as well as ε-caprolactone, εcaprolactam, and other cyclic esters, etc.

Examples of the nitrogen-containing compounds include urea, pyrrolidone, N-methyl-2-pyrrolidone, octyl pyrrolidone, etc.

Preferably the content of the water-soluble organic solvent in the water-soluble pigment type inkjet ink composition is 20 to 40 percent by mass.

For use on low-absorbent media (coated paper, etc.), preferably a solvent that permeates easily into low-absorbent media is used.

<Surface-active Agent>

For the surface-active agent used under the present invention, at least one type selected from acetylene glycol compounds expressed by Formula (1), compounds of HLB 4 to 14 obtained by adding ethylene oxide to acetylene diol compounds, silicon surface-active agents, and fluorine surface-active agents, may be used.

Formula (1)

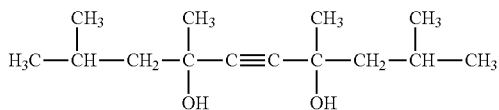

Specific examples of the acetylene glycol compounds expressed by Formula (1) include Surfynol 104E, Surfynol 104H, Surfynol 104A, Surfynol 104BC, Surfynol 104DPM, Surfynol 104PA, Surfynol 104PG-50, etc., manufactured by Air Products.

Specific examples of the compounds of HLB 4 to 14 obtained by adding ethylene oxide to acetylene diol compounds include Surfynol 420, Surfynol 440, etc., manufactured by Air Products.

As for the silicon surface-active agents and fluorine surface-active agents, any known types traditionally used in water-based inkjet ink compositions may be used.

Preferably the content of the surface-active agent in the water-based pigment type inkjet ink composition is 0.1 to 3.0 percent by mass. If the content of the surface-active agent is less than 0.1 percent by mass, the dot expandability and the uniformity of solid areas on the printed matter tend to drop; if the content exceeds 3.0 percent by mass, on the other hand, the storage stability of the ink tends to worsen, which is not desirable.

"HLB" mentioned above is a measure of the balance of hydrophilic parts and hydrophobic parts of a molecule (hydrophile-lipophile balance), used in the field of surface-active agents; specifically, the greater the HLB value on a scale of 0 to 20, the higher the hydrophilicity.

The HLB values used under the present invention are based on the definition using Griffin's Formula below.

HLB=20×Total sum of the formula weights of hydrophilic parts in the surface-active agent/ Molecular weight of the surface-active agen[Griffin's Formula]

<Additives>

Furthermore, any known additives such as resin emulsion, pigment dispersant, antifungal agent, rustproof agent, thickening agent, antioxidant, UV absorbent, storability improving agent, defoaming agent, and pH adjusting agent may be added to the water-based pigment type inkjet ink composition proposed by the present invention, according to the purpose.

(Resin Emulsion)

The resin emulsion may be an acrylic resin emulsion, styrene-acrylic resin emulsion, polyester resin emulsion, polyurethane resin emulsion, polyvinyl acetate resin emulsion, polyvinyl chloride resin emulsion, polybutadiene resin emulsion, polyethylene resin emulsion, etc., with a glass transition temperature of 20° C. or below. Among these, styrene-acrylic resin emulsion is preferred for superior appearance and various resistance characteristics of the obtained printed matter.

If a resin emulsion with a glass transition temperature of 20° C. or above is used, the drying property of the coating film and the adhesion to non-absorbent base materials drop, which is not desirable.

The solids content of the resin emulsion in the water-based pigment type inkjet ink composition is preferably 1 to 10 percent by mass, or more preferably 2 to 5 percent by mass.

If the solids content of the resin emulsion is less than 1 percent by mass, the appearance and various resistance characteristics of the obtained printed matter tend to drop; if it exceeds 10 percent by mass, on the other hand, ink discharge tends to become unstable, which is not desirable.

Glass Transition Temperature

The glass transition temperature of the resin emulsion is a theoretical glass transition temperature obtained by Wood's Formula below:

$1/Tg = W1/Tg1 + W2/Tg2 + W3/Tg3 + \ldots + Wx/Tgx$  Wood's Formula:

(In the formula, Tg1 to Tgx represent the glass transition temperatures of the homopolymers corresponding to monomers 1, 2, 3, . . . , x constituting the alkali-soluble resin, respectively, W1 to Wx represent the polymerization ratios of monomers 1, 2, 3, . . . , x, respectively, and Tg represents the theoretical glass transition temperature. It should be noted that, in Wood's Formula, the glass transition temperatures are absolute temperatures)

[Method for Manufacturing Water-based Pigment Type Inkjet Ink Composition]

Methods for manufacturing a water-based pigment type inkjet ink composition using the aforementioned constitutional components include, among others, a method whereby: a pigment, a water-based resin varnish constituted by an alkali-soluble resin dissolved in water in the presence of a basic compound, and a pigment dispersant, etc., as necessary, are mixed and then the pigment is dispersed using any of various dispersion machines such as ball mill, attritor, roll mill, sand mill, agitator mill, etc.; after which the pigment is obtained by depositing the alkali-soluble resin onto the pigment surface using the acid precipitation method, the ion exchange means described in Domestic Re-publication of International Patent Application No. WO2005/116147, the phase inversion emulsification method, etc.; after which 50 to 90% of the acid groups in the alkali-soluble resin that has been deposited on the surface of the obtained pigment are neutralized by a basic compound, and the resulting pigment is dispersed again in water using any of various dispersion machines (high-speed agitator, etc.); after which a crosslinking agent having two or more functionalities is added and the mixture is heated to 50 to 80° C. to achieve crosslinking, and then the remaining materials are added, to prepare a water-based pigment type inkjet ink composition.

The manufactured water-based pigment type inkjet ink composition proposed by the present invention, as obtained above, has an initial viscosity in a range of 2.0 to 10.0 mPa·s, or preferably 3.0 to 9.0 mPa·s, and a static surface tension in a range of 25 to 40 mN/m.

[Printing Method]

Next, printing methods using the water-based pigment type inkjet ink composition proposed by the present invention, are explained.

For the printing media for the water-based pigment type inkjet ink composition proposed by the present invention, art paper, dedicated inkjet paper, glossy inkjet paper, and other types of coated paper, etc., may be used.

It should be noted that the present invention may also be used on plain paper, offset printing paper and other types of uncoated paper.

And, for example, the aforementioned water-based pigment type inkjet ink composition proposed by the present invention may be charged in an ink cartridge, and the ink cartridge may be installed in a single-pass or other inkjet recording system, with the ink composition injected from the nozzle onto any of the aforementioned base materials for printing, to implement inkjet printing.

EXAMPLES

The present invention is explained in detail below by citing examples; however, the present invention is not limited to these examples. It should be noted that, unless otherwise specified, "%" refers to "percent by mass."

(Water-based Resin Varnish)

<Water-based Resin Varnish A>

Twenty-five parts by mass of an acrylic acid/lauryl acrylate (LA)/styrene copolymer (25/30/45) with a weight-averaged molecular weight of 23,000 and an acid value of 185 KOHmg/g, were dissolved in a solution prepared by mixing 4.9 parts by mass of potassium hydroxide and 70.1 parts by mass of water, to obtain water-based resin varnish A with a solids content of 25%.

<Water-based Resin Varnish B>

Twenty-five parts by mass of an acrylic acid/lauryl acrylate/styrene copolymer (25/20/55) with a weight-averaged molecular weight of 23,000 and an acid value of 185 KOHmg/g, were dissolved in a solution prepared by mixing 4.9 parts by mass of potassium hydroxide and 70.1 parts by mass of water, to obtain water-based resin varnish B with a solids content of 25%.

<Water-based Resin Varnish C>

Twenty-five parts by mass of an acrylic acid/lauryl acrylate/styrene copolymer (25/40/35) with a weight-averaged molecular weight of 23,000 and an acid value of 185 KOHmg/g, were dissolved in a solution prepared by mixing 4.9 parts by mass of potassium hydroxide and 70.1 parts by mass of water, to obtain water-based resin varnish C with a solids content of 25%.

<Water-based Resin Varnish D>

Twenty-five parts by mass of an acrylic acid/lauryl acrylate/styrene copolymer (20/30/50) with a weight-averaged molecular weight of 23,000 and an acid value of 150 KOHmg/g, were dissolved in a solution prepared by mixing 3.9 parts by mass of potassium hydroxide and 71.1 parts by mass of water, to obtain water-based resin varnish D with a solids content of 25%.

<Water-based Resin Varnish E>

Twenty-five parts by mass of an acrylic acid/stearyl acrylate (SA)/styrene copolymer (25/30/45) with a weight-averaged molecular weight of 23,000 and an acid value of 185 KOHmg/g, were dissolved in a solution prepared by mixing 4.9 parts by mass of potassium hydroxide and 70.1 parts by mass of water, to obtain water-based resin varnish E with a solids content of 25%.

<Water-based Resin Varnish F>

Twenty-five parts by mass of an acrylic acid/lauryl acrylate/styrene copolymer (25/45/30) with a weight-averaged molecular weight of 23,000 and an acid value of 185 KOHmg/g, were dissolved in a solution prepared by mixing 4.9 parts by mass of potassium hydroxide and 70.1 parts by mass of water, to obtain water-based resin varnish F with a solids content of 25%.

<Water-based Resin Varnish G>

Twenty-five parts by mass of an acrylic acid/lauryl acrylate/styrene copolymer (25/15/60) with a weight-averaged molecular weight of 23,000 and an acid value of 185 KOHmg/g, were dissolved in a solution prepared by mixing 4.9 parts by mass of potassium hydroxide and 70.1 parts by mass of water, to obtain water-based resin varnish G with a solids content of 25%.

<Water-based Resin Varnish H>

Twenty-five parts by mass of an acrylic acid/lauryl acrylate (LA)/styrene copolymer (4/30/66) with a weight-averaged molecular weight of 23,000 and an acid value of 30 KOHmg/g, were dissolved in a solution prepared by mixing 0.8 parts by mass of potassium hydroxide and 74.2 parts by mass of water, to obtain water-based resin varnish H with a solids content of 25%.

<Water-based Resin Varnish I>

Twenty-five parts by mass of an acrylic acid/lauryl acrylate (LA)/styrene copolymer (44.6/30/25.4) with a weight-averaged molecular weight of 23,000 and an acid value of 330 KOHmg/g, were dissolved in a solution prepared by mixing 8.7 parts by mass of potassium hydroxide and 66.3 parts by mass of water, to obtain water-based resin varnish I with a solids content of 25%.

<Water-based Resin Varnish J>

Twenty-five parts by mass of an acrylic acid/lauryl acrylate (LA)/styrene copolymer (25/30/45) with a weight-averaged molecular weight of 20,000 and an acid value of 185 KOHmg/g, were dissolved in a solution prepared by mixing 4.9 parts by mass of potassium hydroxide and 70.1 parts by mass of water, to obtain water-based resin varnish J with a solids content of 25%.

<Water-based Resin Varnish K>

Twenty-five parts by mass of an acrylic acid/lauryl acrylate (LA)/styrene copolymer (25/30/45) with a weight-averaged molecular weight of 30,000 and an acid value of 185 KOHmg/g, were dissolved in a solution prepared by mixing 4.9 parts by mass of potassium hydroxide and 70.1 parts by mass of water, to obtain water-based resin varnish K with a solids content of 25%.

<Water-based Resin Varnish L>

Twenty-five parts by mass of an acrylic acid/lauryl acrylate (LA)/styrene copolymer (25/30/45) with a weight-averaged molecular weight of 40,000 and an acid value of 185 KOHmg/g, were dissolved in a solution prepared by mixing 4.9 parts by mass of potassium hydroxide and 70.1 parts by mass of water, to obtain water-based resin varnish L with a solids content of 25%.

<Water-based Resin Varnish M>

Twenty-five parts by mass of an acrylic acid/lauryl acrylate (LA)/benzyl methyl acrylate copolymer (25/30/45) with a weight-averaged molecular weight of 23,000 and an acid value of 185 KOHmg/g, were dissolved in a solution prepared by mixing 4.9 parts by mass of potassium hydroxide and 70.1 parts by mass of water, to obtain water-based resin varnish M with a solids content of 25%.

(Water-based Pigment Base Ink)

<Preparation of Water-based Black Base Ink 1> Mw 23,000, Acid Value 185, LA 30%

Thirty-two parts by mass of water-based resin varnish A (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 1.

<Preparation of Water-based Black Base Ink 2> Mw 23,000, Acid Value 185, LA 20%

Thirty-two parts by mass of water-based resin varnish B (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 2.

<Preparation of Water-based Black Base Ink 3> Mw 23,000, Acid Value 185, LA 40%

Thirty-two parts by mass of water-based resin varnish C (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 3.

<Preparation of Water-based Black Base Ink 4> Mw 23,000, Acid Value 150, LA 30%

Thirty-two parts by mass of water-based resin varnish D (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 4.

<Preparation of Water-based Black Base Ink 5> Mw 23,000, Acid Value 185, SA 30%

Thirty-two parts by mass of water-based resin varnish E (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 5.

<Preparation of Water-based Black Base Ink 6> Mw 23,000, Acid Value 185, LA 45%

Thirty-two parts by mass of water-based resin varnish F (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 6.

<Preparation of Water-based Black Base Ink 7> Mw 23,000, Acid Value 185, LA 15%

Thirty-two parts by mass of water-based resin varnish G (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 7.

<Preparation of Water-based Black Base Ink 8> Mw 23,000, Acid Value 30, LA 30%

Thirty-two parts by mass of water-based resin varnish H (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 8.

<Preparation of Water-based Black Base Ink 9> Acid Value 330, LA 30%

Thirty-two parts by mass of water-based resin varnish I (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 9.

<Preparation of Water-based Black Base Ink 10> Mw 20,000, Acid Value 185, LA 30%

Thirty-two parts by mass of water-based resin varnish J (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 10.

<Preparation of Water-based Black Base Ink 11> Mw 30,000, Acid Value 185, LA 30%

Thirty-two parts by mass of water-based resin varnish K (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 11.

<Preparation of Water-based Black Base Ink 12> Mw 40,000, Acid Value 185, LA 30%

Thirty-two parts by mass of water-based resin varnish L (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 12.

<Preparation of Water-based Black Base Ink 13> Mw 23,000, Acid Value 185, LA 30%

Thirty-two parts by mass of water-based resin varnish M (solids content 25%) and 48 parts by mass of water were added and mixed together, to prepare a resin varnish for pigment dispersion. This varnish was further mixed with 20 parts by mass of carbon black (product name: Printex 90, manufactured by Degussa (currently Orion Engineered Carbons; the same applies hereinafter)) under agitation and then kneaded in a wet circulation mill, to prepare water-based black base ink 13.

<Preparation of Water-based Yellow Base Ink> Mw 23,000, Acid Value 185, LA 30%

Thirty-two parts by mass of water-based resin varnish A (solids content 25%) and 48 parts by mass of water were added and mixed together, to prepare a resin varnish for pigment dispersion. This varnish was further mixed with 20 parts by mass of yellow pigment (product name: Novoperm Yellow 4G01, manufactured by Clariant) under agitation and then kneaded in a wet circulation mill, to prepare a water-based yellow base ink.

<Preparation of Water-based Magenta Base Ink> Mw 23,000, Acid Value 185, LA 30%

Thirty-two parts by mass of water-based resin varnish A (solids content 25%) and 48 parts by mass of water were added and mixed together, to prepare a resin varnish for pigment dispersion. This varnish was further mixed with 20 parts by mass of magenta pigment (product name: Ink Jet Magenta E5B02, manufactured by Clariant) under agitation and then kneaded in a wet circulation mill, to prepare a water-based magenta base ink.

<Preparation of Water-based Cyan Base Ink> Mw 23,000, Acid Value 185, LA 30%

Thirty-two parts by mass of water-based resin varnish A (solids content 25%) and 48 parts by mass of water were added and mixed together, to prepare a resin varnish for pigment dispersion. This varnish was further mixed with 20 parts by mass of cyan pigment (product name: Heliogen Blue L7101F, manufactured by BASF) under agitation and then kneaded in a wet circulation mill, to prepare a water-based cyan base ink.

(Manufacturing of Pigment Coated with Alkali-soluble Resin)

Each of the aforementioned water-based inkjet base inks of respective colors was diluted in water to a pigment concentration of 5%, after which a cationic exchanger resin (DOWEX MONO SPHERE (H) 650C, manufactured by Dow Chemical) was added to the liquid dilution and the mixture was agitated to implement ion exchange until the pH dropped to below 4, to obtain each resin-coated pigment. Thereafter, the ion exchanger resin was filtered out through a mesh and then suction-filtered, to obtain a water-containing cake containing each resin-coated pigment (solids content 25%).

(Water-based Liquid Pigment Dispersion) (Resin:Pigment=8:20)

To the water-containing cakes containing the aforementioned resin-coated pigments, respectively, enough sodium hydroxide to neutralize 45%, 55%, 65%, 75% or 95% of the acid groups in the alkali-soluble resin in each resin-coated pigment, as well as enough water to achieve a pigment concentration of 12%, were added, after which the mixtures were agitated in a high-pressure emulsification and dispersion machine (Gaulin Homogenizer, manufactured by A. P. V. Gaulin Inc.), to obtain water-based liquid pigment dispersions 1 to 22.

Water-based liquid pigment dispersion 1 (Water-based black base ink 1, Mw 23,000, acid value 185, LA 30%, degree of neutralization 45%)

Water-based liquid pigment dispersion 2 (Water-based black base ink 1, Mw 23,000, acid value 185, LA 30%, degree of neutralization 55%)

Water-based liquid pigment dispersion 3 (Water-based black base ink 1, Mw 23,000, acid value 185, LA 30%, degree of neutralization 65%)

Water-based liquid pigment dispersion 4 (Water-based black base ink 1, Mw 23,000, acid value 185, LA 30%, degree of neutralization 75%)

Water-based liquid pigment dispersion 5 (Water-based black base ink 1, Mw 23,000, acid value 185, LA 30%, degree of neutralization 95%)

Water-based liquid pigment dispersion 6 (Water-based black base ink 2, Mw 23,000, acid value 185, LA 20%, degree of neutralization 65%)

Water-based liquid pigment dispersion 7 (Water-based black base ink 3, Mw 23,000, acid value 185, LA 40%, degree of neutralization 65%)

Water-based liquid pigment dispersion 8 (Water-based black base ink 4, Mw 23,000, acid value 150, LA 30%, degree of neutralization 65%)

Water-based liquid pigment dispersion 9 (Water-based black base ink 5, Mw 23,000, acid value 185, SA 30%, degree of neutralization 65%)

Water-based liquid pigment dispersion 10 (Water-based black base ink 6, Mw 23,000, acid value 185, LA 45%, degree of neutralization 65%)

Water-based liquid pigment dispersion 11 (Water-based black base ink 7, Mw 23,000, acid value 185, LA 15%, degree of neutralization 65%)

Water-based liquid pigment dispersion 12 (Water-based black base ink 8, Mw 23,000, acid value 30, LA 15%, degree of neutralization 65%)

Water-based liquid pigment dispersion 13 (Water-based black base ink 9, Mw 23,000, acid value 330, LA 15%, degree of neutralization 65%)

Water-based liquid pigment dispersion 14 (Water-based yellow base ink, Mw 23,000, acid value 185, LA 30%, degree of neutralization 65%)

Water-based liquid pigment dispersion 15 (Water-based magenta base ink, Mw 23,000, acid value 185, LA 30%, degree of neutralization 65%)

Water-based liquid pigment dispersion 16 (Water-based cyan base ink, Mw 23,000, acid value 185, LA 30%, degree of neutralization 65%)

Water-based liquid pigment dispersion 17 (Water-based black base ink 10, Mw 20,000, acid value 185, LA 30%, degree of neutralization 65%)

Water-based liquid pigment dispersion 18 (Water-based black base ink 11, Mw 30,000, acid value 185, LA 30%, degree of neutralization 65%)

Water-based liquid pigment dispersion 19 (Water-based black base ink 12, Mw 40,000, acid value 185, LA 30%, degree of neutralization 65%)

Water-based liquid pigment dispersion 20 (Water-based black base ink 13, Mw 23,000, acid value 185, LA 30%, BMA 45%, degree of neutralization 55%)

Water-based liquid pigment dispersion 21 (Water-based black base ink 13, Mw 23,000, acid value 185, LA 30%, BMA 45%, degree of neutralization 65%)

Water-based liquid pigment dispersion 22 (Water-based black base ink 13, Mw 23,000, acid value 185, LA 30%, BMA 45%, degree of neutralization 75%)

LA: Lauryl acrylate
SA: Stearyl acrylate
BMA: Benzyl acrylate (Water-based Liquid Crosslinking Grain Dispersion)

Water-based liquid pigment dispersions 1 to 22 were each mixed with water and a crosslinking agent having two or more functionalities (Epolite 1600, Chemitite DZ-22E or Denacol EX-614) according to Table 1, after which the mixtures were heated to 60° C. for 24 hours, to obtain water-based liquid crosslinking grain dispersions 1 to 21.

(Water-based Pigment Type Inkjet Ink Compositions for Plain Paper)

Next, for use on uncoated plain paper media, the aforementioned water-based liquid pigment dispersions were each mixed, under agitation, with resin emulsion, water-soluble organic solvent, surface-active agent, and water, according to the percent-by-mass ratios in Table 2, to obtain the water-based pigment type inkjet ink compositions in Examples 1 to 19 and Comparative Examples 1 to 9 shown in Table 2.

TABLE 1

| Water-based liquid crosslinking grain dispersion | | Examples | | | | | | | | | |
|---|---|---|---|---|---|---|---|---|---|---|---|
| | | 1 | 2 | 3 | 4 | 5 | 6 | 7 | 8 | 9 | 10 |
| Water-based liquid pigment dispersion | No. | 2 | 3 | 4 | 6 | 7 | 8 | 14 | 15 | 16 | 3 |
| | (AV) | 185 | 185 | 186 | 185 | 185 | 150 | 185 | 185 | 185 | 185 |
| | MW | 23000 | 23000 | 23000 | 23000 | 23000 | 23000 | 23000 | 23000 | 23000 | 23000 |
| | Degree of neutralization (%) | 55 | 65 | 75 | 65 | 65 | 65 | 65 | 65 | 65 | 65 |
| | LA or SA content (%) | 30 | 30 | 30 | 20 | 40 | 30 | 30 | 30 | 30 | 30 |
| Quantity of water-based liquid pigment dispersion used | | 75 | 75 | 75 | 75 | 75 | 75 | 75 | 75 | 75 | 75 |
| Crosslinking agent | Epolite 1600 | 1.2 | 1.2 | 1.2 | 1.2 | 1.2 | 0.97 | 1.2 | 1.2 | 1.2 | |
| | Denacol EX-614 | | | | | | | | | | 1.3 |
| | Chemitite DZ-22E | | | | | | | | | | |
| Crosslinking ratio (%) | | 40 | 40 | 40 | 40 | 40 | 40 | 40 | 40 | 40 | 40 |
| Water | | rest | rest | rest | rest | rest | rest | rest | rest | rest | rest |
| Total | | 100 | 100 | 100 | 100 | 100 | 100 | 100 | 100 | 100 | 100 |

| Water-based liquid crosslinking grain dispersion | | Examples | | | | | | | | |
|---|---|---|---|---|---|---|---|---|---|---|
| | | 11 | 12 | 13 | 14 | 15 | 16 | 17 | 18 | 19 |
| Water-based liquid pigment dispersion | No. | 3 | 3 | 3 | 17 | 18 | 19 | 20 | 21 | 22 |
| | (AV) | 185 | 185 | 185 | 185 | 185 | 185 | 185 | 185 | 185 |
| | MW | 23000 | 23000 | 23000 | 20000 | 30000 | 40000 | 23000 | 23000 | 23000 |
| | Degree of neutralization (%) | 65 | 65 | 65 | 65 | 65 | 65 | 55 | 65 | 75 |
| | LA or SA content (%) | 30 | 30 | 30 | 30 | 30 | 30 | 30 | 30 | 30 |
| Quantity of water-based liquid pigment dispersion used | | 75 | 75 | 75 | 75 | 75 | 75 | 75 | 75 | 75 |
| Crosslinking agent | Epolite 1600 | | 0.6 | 2.4 | 1.2 | 1.2 | 1.2 | 1.2 | 1.2 | 1.2 |
| | Denacol EX-614 | | | | | | | | | |
| | Chemitite DZ-22E | 4.4 | | | | | | | | |
| Crosslinking ratio (%) | | 40 | 20 | 80 | 40 | 40 | 40 | 40 | 40 | 40 |
| Water | | rest | rest | rest | rest | rest | rest | rest | rest | rest |
| Total | | 100 | 100 | 100 | 100 | 100 | 100 | 100 | 100 | 100 |

| Water-based liquid crosslinking grain dispersion | | Comparative Examples | | | | | | | |
|---|---|---|---|---|---|---|---|---|---|
| | | 14 | 15 | 16 | 17 | 18 | 19 | 20 | 21 |
| Water-based liquid pigment dispersion | No. | 1 | 5 | 9 | 10 | 11 | 12 | 13 | 3 |
| | (AV) | 185 | 185 | 185 | 185 | 185 | 30 | 330 | 185 |
| | Degree of neutralization (%) | 45 | 95 | 65 | 65 | 65 | 65 | 65 | 65 |
| | LA or SA content (%) | 30 | 30 | SA30 | 45 | 15 | 30 | 30 | 30 |
| Quantity of water-based liquid pigment dispersion used | | 75 | 75 | 75 | 75 | 75 | 75 | 75 | 75 |
| Crosslinking agent | Epolite 1600 | 1.2 | 1.2 | 1.2 | 1.2 | 1.2 | 0.19 | 2.14 | |
| | Denacol EX-614 | | | | | | | | |
| | Chemitite DZ-22E | | | | | | | | |
| Crosslinking ratio (%) | | 40 | 40 | 40 | 40 | 40 | 40 | 40 | 0 |
| Water | | rest | rest | rest | rest | rest | rest | rest | rest |
| Total | | 100 | 100 | 100 | 100 | 100 | 100 | 100 | 100 |

"(AV)" stands for "(acid value)".
"rest" refers to "the rest."

TABLE 2

|  |  | Examples | | | | | | | | | |
|---|---|---|---|---|---|---|---|---|---|---|---|
|  |  | 1 | 2 | 3 | 4 | 5 | 6 | 7 | 8 | 9 | 10 |
| Water-based liquid crosslinking grain dispersion | No. | 1 | 2 | 3 | 4 | 5 | 6 | 7 | 8 | 9 | 10 |
|  | Quantity used | 55 | 55 | 55 | 55 | 55 | 55 | 55 | 55 | 55 | 55 |
| Surface-active agent (Surfynol 465) |  | 1 | 1 | 1 | 1 | 1 | 1 | 1 | 1 | 1 | 1 |
| Water-soluble organic solvent | PG | 30 | 30 | 30 | 30 | 30 | 30 | 30 | 30 | 30 | 30 |
| Water |  | rest | rest | rest | rest | rest | rest | rest | rest | rest | rest |
| Total |  | 100 | 100 | 100 | 100 | 100 | 100 | 100 | 100 | 100 | 100 |
| Storage stability |  | ○ | ○ | ○ | ○ | ○ | ○ | ○ | ○ | ○ | ○ |
| Solidification property |  | ○ | ○ | ○ | ○ | ○ | ○ | ○ | ○ | ○ | ○ |
| Optical densities |  | ○ | ○ | ○ | ○ | ○ | ○ | ○ | ○ | ○ | ○ |

|  |  | Examples | | | | | | | | |
|---|---|---|---|---|---|---|---|---|---|---|
|  |  | 11 | 12 | 13 | 14 | 15 | 16 | 17 | 18 | 19 |
| Water-based liquid crosslinking grain dispersion | No. | 11 | 12 | 13 | 14 | 15 | 16 | 17 | 18 | 19 |
|  | Quantity used | 55 | 55 | 55 | 55 | 55 | 55 | 55 | 55 | 55 |
| Surface-active agent (Surfynol 465) |  | 1 | 1 | 1 | 1 | 1 | 1 | 1 | 1 | 1 |
| Water-soluble organic solvent | PG | 30 | 30 | 30 | 30 | 30 | 30 | 30 | 30 | 30 |
| Water |  | rest | rest | rest | rest | rest | rest | rest | rest | rest |
| Total |  | 100 | 100 | 100 | 100 | 100 | 100 | 100 | 100 | 100 |
| Storage stability |  | ○ | ○ | ○ | ○ | ○ | ○ | ○ | ○ | ○ |
| Solidification property |  | ○ | ○ | ○ | ○ | ○ | ○ | ○ | ○ | ○ |
| Optical densities |  | ○ | ○ | ○ | ○ | ○ | ○ | ○ | ○ | ○ |

|  |  | Comparative Examples | | | | | | | | |
|---|---|---|---|---|---|---|---|---|---|---|
|  |  | 1 | 2 | 3 | 4 | 5 | 6 | 7 | 8 | 9 |
| Water-based liquid crosslinking grain dispersion | No. | 14 | 15 | 16 | 17 | 18 | 19 | 20 | 21 | 14 |
|  | Quantity used | 55 | 55 | 55 | 55 | 55 | 55 | 55 | 55 | 25 |
| Surface-active agent (Surfynol 465) |  | 1 | 1 | 1 | 1 | 1 | 1 | 1 | 1 | 1 |
| Water-soluble organic solvent | PG | 30 | 30 | 30 | 30 | 30 | 30 | 30 | 30 | 30 |
| Water |  | rest | rest | rest | rest | rest | rest | rest | rest | rest |
| Total |  | 100 | 100 | 100 | 100 | 100 | 100 | 100 | 100 | 100 |
| Storage stability |  | Δ | Δ | Δ | Δ | Δ | Δ | x | Δ | ○ |
| Solidification property |  | Δ | x | Δ | Δ | Δ | Δ | x | Δ | ○ |
| Optical densities |  | ○ | ○ | ○ | ○ | ○ | ○ | ○ | ○ | x |

(Water-based Pigment Type Inkjet Ink Compositions for Coated Paper)

Next, the aforementioned water-based liquid pigment dispersions were each mixed, under agitation, with resin emulsion, water-soluble organic solvent, surface-active agent, and water, according to the percent-by-mass ratios in Table 3, to obtain the water-based pigment type inkjet ink compositions for coated paper in Examples 20 to 38 and Comparative Examples 10 to 18 shown in Table 3.

TABLE 3

|  |  | Examples | | | | | | | | | |
|---|---|---|---|---|---|---|---|---|---|---|---|
|  |  | 20 | 21 | 22 | 23 | 24 | 25 | 26 | 27 | 28 | 29 |
| Water-based liquid crosslinking grain dispersion | No. | 1 | 2 | 3 | 4 | 5 | 6 | 7 | 8 | 9 | 10 |
|  | Content | 40 | 40 | 40 | 40 | 40 | 40 | 40 | 40 | 40 | 40 |
| Resin emulsion (NeoCryl A1091) |  | 10 | 10 | 10 | 10 | 10 | 10 | 10 | 10 | 10 | 10 |
| Surface-active agent (Surfynol 440) |  | 1 | 1 | 1 | 1 | 1 | 1 | 1 | 1 | 1 | 1 |
| Water-soluble organic solvent | BDG PG | 20 | 20 | 20 | 20 | 20 | 20 | 20 | 20 | 20 | 20 |
| Water |  | rest | rest | rest | rest | rest | rest | rest | rest | rest | rest |
| Total |  | 100 | 100 | 100 | 100 | 100 | 100 | 100 | 100 | 100 | 100 |
| Storage stability |  | ○ | ○ | ○ | ○ | ○ | ○ | ○ | ○ | ○ | ○ |
| Solidification property |  | ○ | ○ | ○ | ○ | ○ | ○ | ○ | ○ | ○ | ○ |
| Drying property of coating film |  | ○ | ○ | ○ | ○ | ○ | ○ | ○ | ○ | ○ | ○ |

|  |  | Examples | | | | | | | | |
|---|---|---|---|---|---|---|---|---|---|---|
|  |  | 30 | 31 | 32 | 33 | 34 | 35 | 36 | 37 | 38 |
| Water-based liquid crosslinking grain dispersion | No. | 11 | 12 | 13 | 14 | 15 | 16 | 17 | 18 | 19 |
|  | Content | 40 | 40 | 40 | 40 | 40 | 40 | 40 | 40 | 40 |
| Resin emulsion (NeoCryl A1091) |  | 10 | 10 | 10 | 10 | 10 | 10 | 10 | 10 | 10 |

TABLE 3-continued

| Surface-active agent (Surfynol 440) | | 1 | 1 | 1 | 1 | 1 | 1 | 1 | 1 | 1 |
|---|---|---|---|---|---|---|---|---|---|---|
| Water-soluble organic solvent | BDG | 20 | 20 | 20 | 20 | 20 | 20 | 20 | 20 | 20 |
| | PG | | | | | | | | | |
| Water | | rest | rest | rest | rest | rest | rest | rest | rest | rest |
| Total | | 100 | 100 | 100 | 100 | 100 | 100 | 100 | 100 | 100 |
| Storage stability | | ○ | ○ | ○ | ○ | ○ | ○ | ○ | ○ | ○ |
| Solidification property | | ○ | ○ | ○ | ○ | ○ | ○ | ○ | ○ | ○ |
| Drying property of coating film | | ○ | ○ | ○ | ○ | ○ | ○ | ○ | ○ | ○ |

| | | Comparative Examples | | | | | | | | |
|---|---|---|---|---|---|---|---|---|---|---|
| | | 10 | 11 | 12 | 13 | 14 | 15 | 16 | 17 | 18 |
| Water-based liquid | No. | 14 | 15 | 16 | 17 | 18 | 19 | 20 | 21 | 14 |
| crosslinking grain dispersion | Content | 40 | 40 | 40 | 40 | 40 | 40 | 40 | 40 | 40 |
| Resin emulsion (NeoCryl A1091) | | 10 | 10 | 10 | 10 | 10 | 10 | 10 | 10 | 10 |
| Surface-active agent (Surfynol 440) | | 1 | 1 | 1 | 1 | 1 | 1 | 1 | 1 | 1 |
| Water-soluble organic solvent | BDG | 20 | 20 | 20 | 20 | 20 | 20 | 20 | 20 | |
| | PG | | | | | | | | | 20 |
| Water | | rest | rest | rest | rest | rest | rest | rest | rest | rest |
| Total | | 100 | 100 | 100 | 100 | 100 | 100 | 100 | 100 | 100 |
| Storage stability | | Δ | x | Δ | Δ | Δ | x | x | x | ○ |
| Solidification property | | Δ | x | Δ | Δ | Δ | x | x | x | ○ |
| Drying property of coating film | | ○ | ○ | ○ | ○ | ○ | ○ | ○ | ○ | x |

<Printing Evaluation of Water-based Inkjet Ink Compositions>

The water-based inkjet ink compositions were evaluated according to the evaluation methods below, the results of which are shown in Tables 2 and 3.

(Storage Stability)

The water-based pigment type inkjet ink compositions in Examples 1 to 38 and Comparative Examples 1 to 18 were filled in glass vials and kept stationary for seven days at 60° C., after which the water-based pigment type inkjet ink compositions were measured for viscosity to evaluate their storage stability.

Evaluation Criteria

○: The rate of change from the initial viscosity is lower than 10%.

Δ: The rate of change from the initial viscosity is 10% or higher, but lower than 20%.

X: The rate of change from the initial viscosity is 20% or higher.

(Solidification Property)

The water-based pigment type inkjet ink compositions in Examples 1 to 38 and Comparative Examples 1 to 18 were weighed and taken by 2 g onto petri dishes of 40 mm in diameter and kept stationary for 24 hours at 23° C. and 50%, to evaluate their fluidity.

Evaluation Criteria

○: Sufficient fluidity is maintained, and no lines remain after scratching the liquid surface with tweezers.

Δ: Fluidity has worsened, but lines, formed when the liquid surface is scratched with tweezers, disappear within 10 seconds.

X: Fluidity has been lost, and lines, formed when the liquid surface is scratched with tweezers, do not disappear.

(Optical Densities)

The water-based pigment type inkjet ink compositions in Examples 1 to 19 and Comparative Examples 1 to 9 were spread over C2 Paper (manufactured by Fuji Xerox) using a 0.1-mm wire bar, and the colored surfaces were measured for optical densities using a SpectroEye (manufactured by X-Rite).

Evaluation Criteria

○: The optical densities are within the following ranges: (Yellow>0.9, Magenta>1.0, Cyan>1.0, Black>1.1)

X: The optical densities are within the following ranges: (Yellow≤0.9, Magenta≤1.0, Cyan≤1.0, Black≤1.1)

(Drying Property of Coating Film)

The water-based pigment type inkjet ink compositions in Examples 20 to 38 and Comparative Examples 10 to 18 were spread over OK Top Coated Paper (manufactured by Oji Paper) using a 0.1-mm wire bar, and the surfaces were touched with a finger to evaluate the time until the ink no longer attached to the finger.

Evaluation Criteria

○: The ink dries within 30 seconds, after which it no longer attaches to the finger.

X: The ink does not dry after 30 seconds and attaches to the finger.

The water-based pigment type inkjet ink compositions according to the present invention had excellent storage stability, demonstrated excellent solidification property regardless of whether they were used on plain paper or coated paper, achieved high optical densities even when used on plain paper, and their coating films exhibited excellent drying property when used on coated paper.

On the other hand, Comparative Examples 1, 2, 11, and 12 whose degree of neutralization was outside the range specified by the present invention, Comparative Examples 3 and 13 containing stearyl acrylate, Comparative Examples 4, 5, 14, and 15 whose lauryl acrylate content in the total monomers was outside the range specified by the present invention, and Comparative Examples 6, 7, 16, and 17 whose acid value was outside the range specified by the present invention, resulted in inferior storage stability and solidification property. In addition, Comparative Examples 8 and 17 whose crosslinking ratio was 0% resulted in inferior storage stability and solidification property, while Comparative Examples 9 and 18 led to lower optical densities after printing because less water-based liquid crosslinking grain dispersion was used.

What is claimed is:

1. A water-based pigment type inkjet ink composition, containing: a pigment whose surface is formed as a resin layer produced by crosslinking, using a crosslinking agent having two or more functionalities, an alkali-soluble resin whose acid value is 40 to 300 KOHmg/g, and 50 to 90% of whose acid groups have been neutralized by a basic compound; a water-soluble organic solvent; and a surface-active agent; wherein the alkali-soluble resin is such that lauryl (meth)acrylate is contained in the alkali-soluble resin, as its constitutional unit monomer, by 20 to 40 percent by mass relative to a total quantity of monomers.

2. The water-based pigment type inkjet ink composition according to claim 1, wherein a content of the water-soluble organic solvent in the water-based pigment type inkjet ink composition is 10 to 40 percent by mass.

3. The water-based pigment type inkjet ink composition according to claim 1, characterized in that the crosslinking agent is a bifunctional epoxy crosslinking agent.

4. The water-based pigment type inkjet ink composition according to claim 3, wherein a content of the water-soluble organic solvent in the water-based pigment type inkjet ink composition is 10 to 40 percent by mass.

5. A method for manufacturing water-based pigment type inkjet ink composition, comprising: forming a coating layer on a surface of a pigment using an alkali-soluble resin which contains lauryl (meth)acrylate by 20 to 40 percent by mass, whose acid value is 40 to 300 KOHmg/g, and 50 to 90% of whose acid groups have been neutralized by a basic compound; crosslinking this coating layer using a crosslinking agent having two or more functionalities, to obtain a coated pigment; and mixing this coated pigment with a water-soluble organic solvent and a surface-active agent.

6. The method for manufacturing water-based pigment type inkjet ink composition according to claim 5, wherein a content of the water-soluble organic solvent in the water-based pigment type inkjet ink composition is 10 to 40 percent by mass.

7. The method for manufacturing water-based pigment type inkjet ink composition according to claim 5, characterized in that the crosslinking agent is a bifunctional epoxy crosslinking agent.

8. The method for manufacturing water-based pigment type inkjet ink composition according to claim 7, wherein a content of the water-soluble organic solvent in the water-based pigment type inkjet ink composition is 10 to 40 percent by mass.

* * * * *